United States Patent
Nelson et al.

(10) Patent No.: US 12,472,559 B2
(45) Date of Patent: Nov. 18, 2025

(54) MASS AND HEAT FLOW IN ADDITIVE MANUFACTURING SYSTEMS

(71) Applicant: Rolls-Royce Corporation, Indianapolis, IN (US)

(72) Inventors: Scott Nelson, Indianapolis, IN (US); Brandon David Ribic, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 428 days.

(21) Appl. No.: 17/934,410

(22) Filed: Sep. 22, 2022

(65) Prior Publication Data

US 2023/0091046 A1 Mar. 23, 2023

Related U.S. Application Data

(60) Provisional application No. 63/247,534, filed on Sep. 23, 2021.

(51) Int. Cl.
*B22F 10/85* (2021.01)
*B22F 12/90* (2021.01)
(Continued)

(52) U.S. Cl.
CPC .............. *B22F 10/85* (2021.01); *B22F 12/90* (2021.01); *B23K 26/34* (2013.01); *B33Y 30/00* (2014.12);
(Continued)

(58) Field of Classification Search
CPC ........ B22F 10/30; B22F 10/85; B22F 10/368; B22F 12/90; B33Y 10/00; B33Y 30/00; B33Y 50/02; G05B 2219/49023
See application file for complete search history.

(56) References Cited

U.S. PATENT DOCUMENTS 6,534,745 B1 * 3/2003 Lowney ................ B23K 26/32
219/121.84
7,045,738 B1 * 5/2006 Kovacevic ........... B23K 26/342
219/121.64

(Continued)

OTHER PUBLICATIONS

Brown et al., "Insights into Powder Flow Characterization Methods for Directed Energy Distribution Additive Manufacturing Systems," Solid Freeform Fabrication 2018: Proceedings of the 29th Annual International Solid Freeform Symposium—An Additive Manufacturing Conference, Aug. 2018, 13 pp.

(Continued)

*Primary Examiner* — Mong-Shune Chung
(74) *Attorney, Agent, or Firm* — Shumaker & Sieffert, P.A.

(57) ABSTRACT

An additive manufacturing system may include an energy delivery device configured to deliver energy to a build surface of a component to form a melt pool in the build surface of the component; a powder delivery device configured to direct a powder stream toward the melt pool; a plurality of mass sensors, each mass sensor associated with a portion of the additive manufacturing system; a plurality of heat sensors; and one or more computing devices. The computing device(s) are configured to receive data from the plurality of mass sensors; determine an overall mass flux based on the data from the mass sensors; control the powder delivery device based on the overall mass flux; receive data from the plurality of heat sensors; determine an overall heat flux based on the data from the heat sensors; and control the energy delivery device based on the overall heat flux.

12 Claims, 6 Drawing Sheets

(51) Int. Cl.
  *B23K 26/34* (2014.01)
  *B33Y 30/00* (2015.01)
  *B33Y 50/02* (2015.01)

(52) U.S. Cl.
  CPC .... *B33Y 50/02* (2014.12); *G05B 2219/49023* (2013.01)

(56) References Cited

U.S. PATENT DOCUMENTS

| | | | | |
|---|---|---|---|---|
| 11,465,240 | B2 | 10/2022 | Liu | |
| 2006/0081571 | A1* | 4/2006 | Hoebel | C23C 24/10 219/121.64 |
| 2016/0179064 | A1* | 6/2016 | Arthur | G05B 15/02 700/98 |
| 2017/0304944 | A1* | 10/2017 | Symeonidis | B22F 7/06 |
| 2017/0337307 | A1* | 11/2017 | Oancea | B22F 10/20 |
| 2019/0047226 | A1* | 2/2019 | Ishikawa | B33Y 50/02 |
| 2021/0402708 | A1* | 12/2021 | Susnjara | B29C 64/112 |
| 2022/0108051 | A1* | 4/2022 | Liu | B22F 10/85 |
| 2022/0143743 | A1* | 5/2022 | Riemann | B23K 26/342 |
| 2022/0390292 | A1* | 12/2022 | Roghanizad | G01N 25/18 |

OTHER PUBLICATIONS

Melo, "Powder jet particle density distribution analysis and qualification for the laser metal deposition process," Dissertation Universidade Federal de Santa Catarina, retrieved from https://repositorio.ufsc.br/xmlui/handle/123456789/171441, Florianopolis, Dec. 2016, 134 pp.
Sdvizhenskii et al., "Online laser-induced breakdown spectroscopy for metal-particle powder flow analysis during additive manufacturing," Journal of Analytical Atompic Spectrometry, Issue 2, No. 25, Royal Society of Chemistry, Dec. 2, 2019, pp. 246-253.
U.S. Appl. No. 17/932,945, filed Sep. 16, 2022, naming inventors Nelson et al.
U.S. Appl. No. 17/932,959, filed Sep. 16, 2022, naming inventors Nelson et al.
U.S. Appl. No. 17/932,962, filed Sep. 16, 2022, naming inventors Nelson et al.
Chen et al., "Multisensor fusion-based digital twin in additive manufacturing for in-situ quality monitoring and defect correction", Proceedings of the Design Society, Cambridge University Press, Jun. 19, 2023, pp. 2755-2766.
U.S. Appl. No. 18/593,575, filed Mar. 1, 2024, naming inventors Nelson et al.

* cited by examiner

MASS AND HEAT FLOW IN ADDITIVE MANUFACTURING SYSTEMS

This application claims the benefit of U.S. Provisional Patent Application No. 63/247,534, filed 23 Sep. 2021, the entire contents of which is incorporated herein by reference.

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing component to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures.

SUMMARY

In some examples, the disclosure describes an additive manufacturing system that includes an energy delivery device configured to deliver energy to a build surface of a component to form a melt pool in the build surface of the component; a powder delivery device configured to direct a powder stream toward the melt pool; a plurality of mass sensors, each mass sensor associated with a portion of the additive manufacturing system; a plurality of heat sensors; and one or more computing devices. The one or more computing device are configured to: receive data from the plurality of mass sensors; determine an overall mass flux based on the data from the plurality of mass sensors; control the powder delivery device based on the overall mass flux; receive data from the plurality of heat sensors; determine an overall heat flux based on the data from the plurality of heat sensors; and control the energy delivery device based on the overall heat flux.

In some examples, the disclosure describes a method that includes receiving, by one or more computing devices, data from a plurality of mass sensors of an additive manufacturing system, wherein the additive manufacturing system comprises an energy delivery device configured to deliver energy to a build surface of a component to form a melt pool in the build surface of a component, a powder delivery device configured to direct a powder stream toward the melt pool, the plurality of mass sensors, each mass sensor associated with a portion of the additive manufacturing system, and a plurality of heat sensors; determining, by the one or more computing devices, an overall mass flux based on the data from the plurality of mass sensors; controlling, by the one or more computing devices, the powder delivery device based on the overall mass flux; receiving, by the one or more computing devices, data from the plurality of heat sensors; determining, by the one or more computing devices, an overall heat flux based on the data from the plurality of heat sensors; and controlling, by the one or more computing devices, the energy delivery device based on the overall heat flux.

The details of one or more examples are set forth in the accompanying drawings and the description below. Other features, objects, and advantages will be apparent from the description and drawings, and from the claims.

DETAILED DESCRIPTION

The disclosure generally describes techniques and systems for monitoring mass flux and heat flux in a blown powder additive manufacturing technique, such as a directed energy deposition (DED) technique. During blown powder additive manufacturing, a component is built up by adding material to the component in sequential layers. The final component is composed of a plurality of layers of material. In some blown powder additive manufacturing techniques for forming components from metals or alloys, an energy source may direct energy at a substrate to form a melt pool. A powder delivery device may deliver a powder to the melt pool, where at least some of the powder at least partially melts and is joined to the melt pool and, thus, substrate.

The properties of the final component, including the presence or absence of material defects and the resulting microstructure, are a function of a number of variables related to mass flux and heat flux. As such, measurement of mass flux and heat flux within the blown powder additive manufacturing system may enable characterization or prediction of final component properties, control of the blown powder additive manufacturing technique, quality assurance for the final component, development of new blown powder additive manufacturing techniques, and the like.

In accordance with techniques of this disclosure, an additive manufacturing system may include a plurality of sensors for sensing mass flow at various points along the powder flow and a plurality of sensors for sensing heat flow within the system. For instance, the mass flow sensors may include a mass sensor associated with a powder source, a powder flow monitoring system sensing powder flow between an output of a powder delivery device and the melt pool, and a topology sensor for measuring a topology of material added to the melt pool. The thermal sensors may include at least one sensor for monitoring a size and/or temperature of the melt pool and at least one sensor for monitoring a heat flow (e.g., cooling rate) around the melt pool. The sensors may output data to a computing device, which analyzes and/or controls the additive manufacturing system based on the received sensor data. By monitoring mass flow at different points along the powder flow and monitoring heat flow in multiple ways, the system described herein may enable a more complete understanding of mass and heat flux within the system. Accordingly, the computing device may more accurately control operating of the additive manufacturing system.

Figure 1:
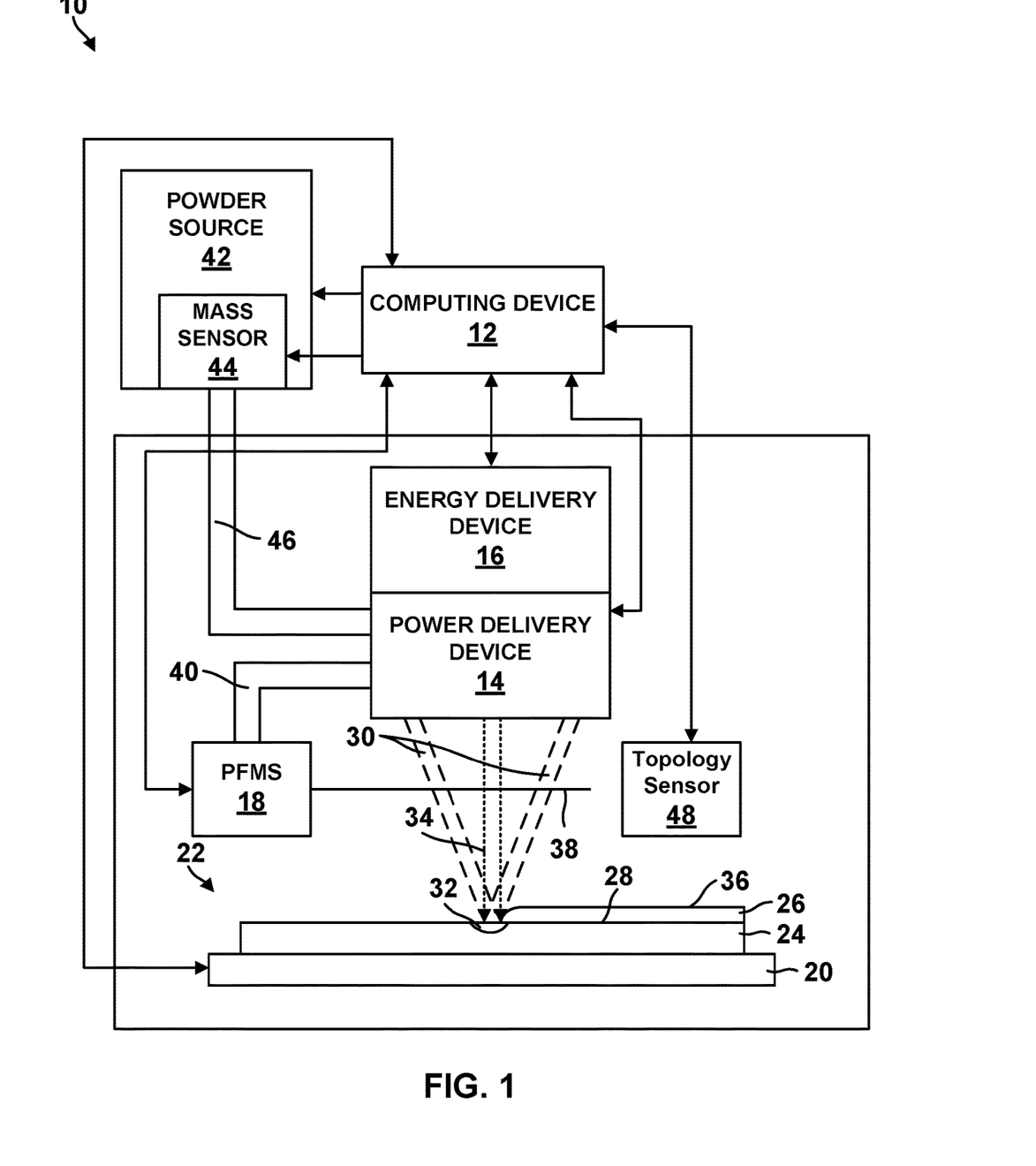
FIG. 1 is a conceptual block diagram illustrating mass flow monitoring aspects of an example additive manufacturing system that includes a powder source mass sensor, a powder flow monitoring system, and a topology sensor configured to monitor mass flow of powder within the additive manufacturing system during an additive manufacturing technique.
Figure 5:
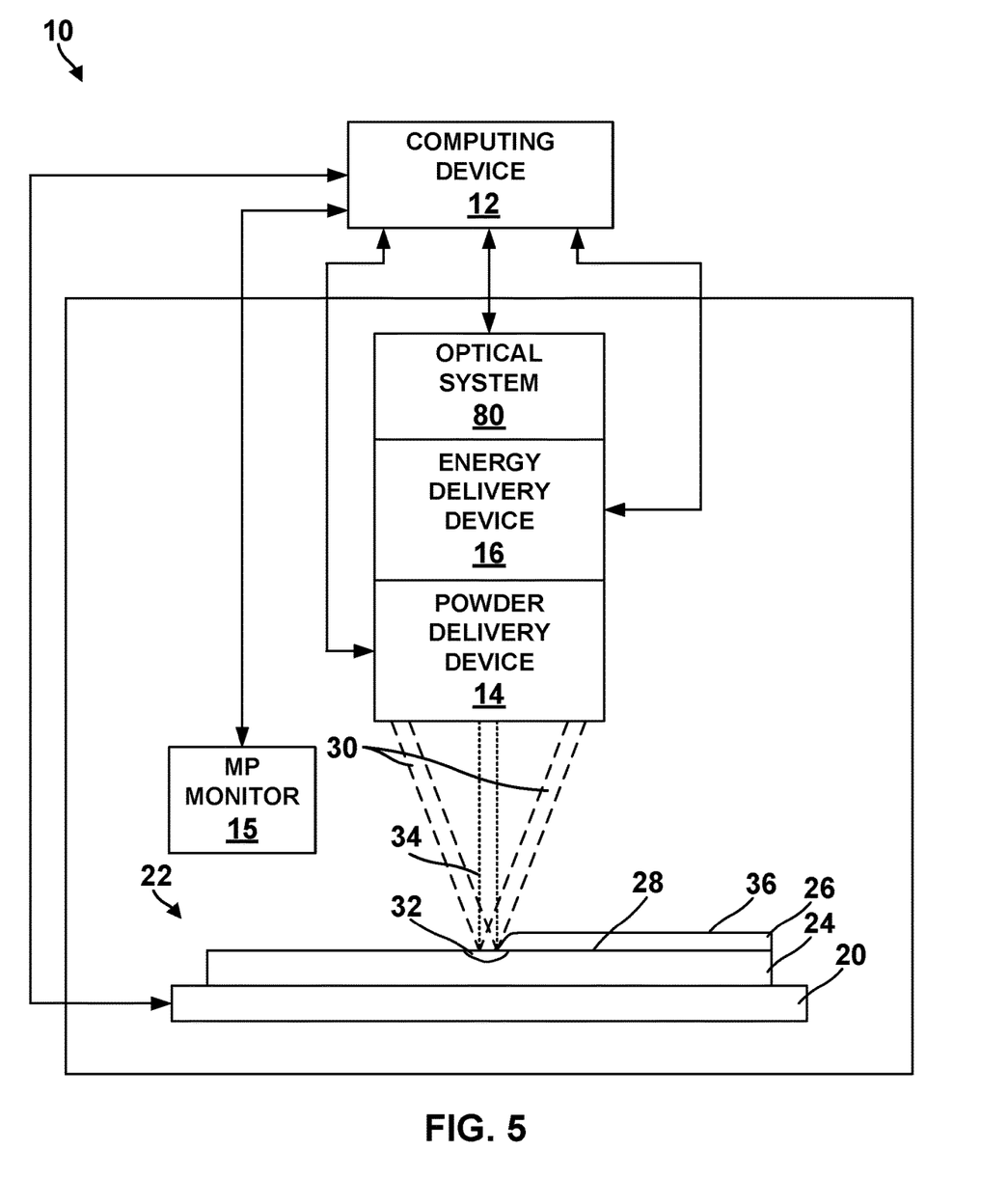
FIG. 5 is a conceptual block diagram illustrating heat flow monitoring aspects of the example additive manufacturing system of FIG. 1, including an optical system for observing thermal emissions around a melt pool and a thermal camera for monitoring a size of the melt pool.

FIG. 1 is a conceptual block diagram illustrating mass flow monitoring aspects of an example additive manufacturing system 10 that includes a powder source mass sensor 44, a powder flow monitoring system 18, and a topology sensor 48 configured to monitor mass flow of powder within additive manufacturing system 10 during an additive manufacturing technique. In the example illustrated in FIG. 1, additive manufacturing system 10 includes a computing device 12, a powder delivery device 14, an energy delivery device 16, PFMS 18, a stage 20, a powder source 42, powder source mass sensor 44, and topology sensor 48. Computing device 12 is operably connected to powder delivery device 14, energy delivery device 16, PFMS 18, stage 20, powder source 42, powder source mass sensor 44, and topology sensor 48. FIG. 1 thus illustrates mass flow monitoring aspects of example additive manufacturing system 10. To simplify illustration of FIG. 1 and improve clarity of the figure, heat flow monitoring aspects of additive manufacturing system 10 are shown in FIG. 5 and described below with reference to FIG. 5.

In some examples, stage 20 is movable relative to energy delivery device 16 and/or energy delivery device 16 is movable relative to stage 20. Similarly, stage 20 may be movable relative to powder delivery device 14 and/or powder delivery device 14 may be movable relative to stage 20. For example, stage 20 may be translatable and/or rotatable along at least one axis to position component 22 relative to energy delivery device 16 and/or powder delivery device 14. Similarly, energy delivery device 16 and/or powder delivery device 14 may be translatable and/or rotatable along at least one axis to position energy delivery device 16 and/or powder delivery device 14, respectively, relative to component 22. Stage 20 may be configured to selectively position and restrain component 22 in place relative to stage 20 during manufacturing of component 22.

Powder source 42 is the source of powder for powder stream 30. Powder source 42 may include any suitable container or enclosure, such as a hopper, configured to hold powder. Powder source 42 also may include mechanism for entraining the powder in a gas flow. For instance, powder source 42 may be coupled to a gas source, which provides a gas flowing through powder source 42 and entraining powder within the gas flow. Additionally, or alternatively, powder source 42 may include an agitator configured to agitate the powder and increase entrainment of the powder in the gas stream.

System 10 may include a powder source mass sensor 44 associated with powder source 42. Powder source mass sensor 44 may be configured to quantify loss of mass in the powder source 42 or, alternatively, a mass flow out of powder source 42.

Powder source 42 is fluidically coupled to powder delivery device 14 via a flow path 46. Flow path 46 may include any suitable structure(s) defining an enclosed flow between powder source 42 and powder delivery device, including conduit, pipe, tubes, or the like. Although not shown in FIG. 1, for at least part of flow path 46 between powder source 42 and nozzles of powder delivery device 14, flow path 46 may split into multiple, parallel sections, e.g., one for each nozzle. Further, although not shown in FIG. 1, in some examples, flow path 46 may include one or more nozzles for controlling flow through flow path 46 as a whole or portions of flow path 46 (e.g., a section associated with a particular nozzle of powder delivery device 14).

Powder delivery device 14 may be configured to deliver powder to selected locations of component 22 being formed via a powder stream 30. Powder delivery device 14 may include one or more nozzles that each output powder. The combined powder defines powder stream 30. In some examples, powder delivery device 14 includes a single nozzle, which may be point nozzle, or a single nozzle that is an annular channel. In other examples, powder delivery device 14 includes a plurality of nozzles (e.g., three nozzles or four nozzles). Regardless of the number of nozzles, powder delivery device 14 may output a powder stream that is focused at a focus plane. As powder delivery device 14 is movable in the z-axis shown in FIG. 1 relative to component 22, the focal plane of powder delivery device 14 also may be movable in the z-axis relative to component 22, such that the focus plane may be controlled to be substantially coincident with build surface 28.

At least some of the powder in powder stream 30 may impact a melt pool 32 in component 22. At least some of the powder that impacts melt pool 32 may be joined to component 22.

In some examples, powder delivery device 14 may be mechanically coupled or attached to energy delivery device 16 to facilitate delivery of powder stream 30 and energy 34 for forming melt pool 32 to substantially the same location adjacent to component 22.

Energy delivery device 16 may include an energy source, such as a laser source, an electron beam source, plasma source, or another source of energy that may be absorbed by component 22 to form a melt pool 32 and/or be absorbed by powder in powder stream 30 to be added to component 22. Example laser sources include a CO laser, a $CO_2$ laser, a Nd:YAG laser, or the like. In some examples, the energy source may be selected to provide energy with a predetermined wavelength or wavelength spectrum that may be absorbed by component 22 and/or the powder to be added to component 22 during the additive manufacturing technique.

In some examples, energy delivery device 16 also includes an energy delivery head, which is operatively connected to the energy source. The energy delivery head may aim, focus, or direct energy 34 toward predetermined positions at or adjacent to a surface of component 22 during the additive manufacturing technique. As described above, in some examples, the energy delivery head may be movable in at least one dimension (e.g., translatable and/or rotatable) under control of computing device 12 to direct the energy toward a selected location at or adjacent to a surface of component 22.

In some examples, at least a portion of energy delivery device 16 and powder delivery device 14 may be combined or attached to each other. For example, a deposition head (e.g., deposition head 54 of FIG. 2) may include part of powder delivery device 14 (e.g., internal channels and powder nozzle(s) 56 for forming powder stream 30 and directing powder stream 30 toward build surface 28) and part of energy delivery device 16 (e.g., the energy delivery head). As shown in FIG. 1, in some examples, energy delivery device 16 may be arranged of configured such that energy 34 and powder stream 30 both exit from a common deposition head and are directed toward build surface 28. For instance, energy 34 may pass through a central channel within the deposition head and exit a central aperture in the deposition head, while fluidized powder may flow through internal channels and powder nozzle(s) 56 for forming powder stream 30 and directing powder stream 30 toward build surface 28.

System 10 also includes powder flow monitoring system (PFMS) 18. PFMS 18 is configured to image at least a portion of powder stream 30 to detect powder flowing between powder delivery device 14 and build surface 28. For example, PFMS 18 may include an illumination device and an imaging device. In some examples, the illumination device may include one or more light source. For instance, the illumination device may include one or more structured light devices, such as one or more lasers. The illumination device is configured to illuminate a plane of powder stream 30 at image plane 38, e.g., a plane substantially perpendicular to an axis extending between powder delivery device 14 and build surface 28.

The imaging device of PFMS 18 is configured to image at least some of the illuminated powder. The imaging device may have a relatively high data acquisition speed (e.g., frame rate), such greater than 1000 Hz. Because of the velocity of the powder in powder stream 30, even such a frame rate may image only a fraction of the powder flowing between powder delivery device 14 and build surface 28.

In some examples, PFMS 18 also includes a housing configured to enclose the illumination device and the imaging device. The housing may be configured to protect the illumination device and the imaging device from damage due to the harsh conditions to which PFMS 18 may be exposed during use. For example, the housing may protect the illumination device and the imaging device from powder deflections from powder stream 30 off build surface 28, may cool the illumination device and the imaging device to remove heat incident on PFMS 18 from melt pool 32 and energy delivery device 16, or the like.

PFMS 18 may be positionally fixed relative to powder delivery device 14 and/or energy delivery device 16, e.g., in the x-y plane shown in FIG. 1. This may help maintain a relative x-y position of PFMS 18 and the image plane of the imaging device relative to powder stream 30. This may facilitate analysis of image data captured by the imaging device.

PFMS 18 may be movable in the z-axis direction of FIG. 1 (e.g., parallel to a longitudinal axis extending from powder delivery device 14 to build surface 28). This may enable movement of image plane 38 along the z-axis of FIG. 1 (e.g., parallel to a longitudinal axis extending from powder delivery device 14 to build surface 28). This may allow PFMS 18 to image powder stream 30 at different positions between powder delivery device 14 and build surface 28. In this way, PFMS 18 may analyze powder stream 30 along powder stream 30 to help determine parameters of powder stream 30 along its length.

In some example, PFMS 18 may be positionally fixed relative to powder delivery device 14 and/or energy delivery device 16 and movable parallel to a longitudinal axis extending from powder delivery device 14 to build surface 28 by an adjustable z-stage 40. Adjustable z-stage 40 may be attached to energy delivery device 16, powder delivery device 14, or a portion of system 10 that moves energy delivery device 16 and/or powder delivery device 14, such that PFMS 18 moves in the x-y axis in registration with energy delivery device 16 and/or powder delivery device 14.

Adjustable z-stage 40 may be controlled by computing device 12 to position PFMS 18 and image plane 38 relative to powder stream 30. Further, computing device 12 may control adjustable z-stage 40 to move PFMS 18 vertically and out of the way to allow powder delivery device 16 and energy delivery device 16 access to physically constrained areas, e.g., between vanes of a doublet or triplet of a nozzle guide vane for a gas turbine engine.

System 10 further includes a topology sensor 48. Topology sensor 48 is configured to monitor an amount of powder captured by melt pool 32 by imaging melt pool 32 and the added material, allowing the mass to be quantified (e.g., by computing device 12) using the dimensions of the added material and density of the material (powder). In some examples, topology sensor 48 includes a laser and a sensor (e.g., an imaging device), which senses laser light reflected by the structure being imaged (e.g., melt pool 32 and the added material). The laser may have a defined wavelength, which may affect the resolution of the topology sensor 48. In some examples, the wavelength and sensor may be selected such that the resolution of topology sensor 48 is a great as about 10 microns (e.g., about 6 microns).

In some examples, topology sensor 48 may be positioned substantially directly above component 22 and may include an interferometer, which provides depth information based on the time from outputting a laser pulse to the sensing of the reflected light. In other examples, topology sensor 48 may be positioned at an offset with respect to component 22 such that the sensor senses depth information without using an interferometer.

In some examples, topology sensor 48 may be integral with system 10, e.g., disposed within the enclosure or working area of system 10. In other examples, topology sensor 48 may be an add-on component to system 10. For example, the enclosure in which the additive manufacturing technique is performed may include a transparent window, and topology sensor 48 may be positioned outside of the enclosure and may image component 22 through the transparent window.

Although a topology sensor 48 is described in the examples of this disclosure, in other examples, another metrology device may be utilized to determine the amount of powder captured by melt pool 32. For example, another type of light source may be used. In some examples, if another type of light source is used, component 22 or stage 20 may include one or more features that serve as indicators of scale.

Computing device 12 is configured to control components of system 10 and may include, for example, a desktop computer, a laptop computer, a workstation, a server, a mainframe, a cloud computing system, or the like. Computing device 12 is configured to control operation of system 10, including, for example, powder delivery device 14, energy delivery device 16, PFMS 18, stage 20, powder source 42, powder source mass sensor 44, and/or topology sensor 48. Computing device 12 may be communicatively coupled to powder delivery device 14, energy delivery device 16, PFMS 18, stage 20, powder source 42, powder source mass sensor 44, and/or topology sensor 48 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Although FIG. 1 illustrates a single computing device 12 and attributes all control and processing functions to that single computing device 12, in other examples, system 10 may include multiple computing devices 12, e.g., a plurality of computing devices 12. In general, control and processing functions described herein may be divided among one or more computing devices. For instance, system 10 may include controller for energy delivery device 16, powder delivery device 14, and stage 20, a separate controller for PFMS 18, and a separate computing device for analyzing data obtained by PFMS 18, mass sensor 44, and topology sensor 48. As another example, system may include a dedicated controller for each of energy delivery device 16, powder delivery device 14, stage 20, PFMS 18, and topology sensor 48, and a separate computing device for coordinating control of powder delivery device 14, energy delivery device 16, PFMS 18, stage 20, powder source 42, powder source mass sensor 44, and/or topology sensor 48 and analyzing data obtained by PFMS 18 powder source mass sensor 44, and/or topology sensor 48. Other examples of computing system architectures for controlling system 10 and analyzing data obtained from system 10 will be apparent and are within the scope of this disclosure.

Computing device 12 may be configured to control operation of powder delivery device 14, energy delivery device 16, adjustable z-stage 40, stage 20, and/or topology sensor 48 to position component 22 relative to powder delivery device 14, energy delivery device 16, PFMS 18, and/or topology sensor 48. For example, as described above, computing device 12 may control stage 20 and powder delivery device 14, energy delivery device 16, adjustable z-stage 40 and/or topology sensor to translate and/or rotate along at least one axis to position component 22 relative to powder delivery device 14, energy delivery device 16, PFMS 18, and/or topology sensor 48. Positioning component 22 relative to powder delivery device 14, energy delivery device 16, PFMS 18, and/or topology sensor 48 may include positioning a predetermined surface (e.g., a surface to which material is to be added) of component 22 in a predetermined orientation relative to powder delivery device 14, energy delivery device 16, PFMS 18, and/or topology sensor 48.

Computing device 12 may be configured to control system 10 to deposit layers 24 and 26 to form component 22. As shown in FIG. 1, component 22 may include a first layer 24 and a second layer 26, although many components may be formed of additional layers, such as tens of layers, hundreds of layers, thousands of layers, or the like. Component 22 in FIG. 1 is simplified in geometry and the number of layers compared to many components formed using additive manufacturing techniques. Although techniques are described herein with respect to component 22 including first layer 24 and second layer 26, the technique may be extended to components 22 with more complex geometry and any number of layers.

To form component 22, computing device 12 may control powder delivery device 14 and energy delivery device 16 to form, on a surface 28 of first layer of material 24, a second layer of material 26 using an additive manufacturing technique. Computing device 12 may control energy delivery device 16 to deliver energy 34 to a volume at or near surface 28 to form melt pool 32. For example, computing device 12 may control the relative position of energy delivery device 16 and stage 20 to direct energy to the volume. Computing device 12 also may control powder delivery device 14 to deliver powder stream 30 to melt pool 32. For example, computing device 12 may control the relative position of powder delivery device 14 and stage 20 to direct powder stream 30 at or on to melt pool 32. Computing device 12 may control powder delivery device 14 and energy delivery device 16 to move energy 34 and powder stream 30 along build surface 28 in a pattern until layer 26 is complete. Computing device 12 then may control a z-axis position of stage 20 and/or powder delivery device 14 and energy delivery device 16 such that melt pool 32 will be formed on surface 36 of second layer 26, and may control powder delivery device 14 and energy delivery device 16 to move energy 34 and powder stream 30 along build surface 28 in a pattern until layer 26 is complete. Computing device 12 may control powder delivery device 14 and energy delivery device 16 similarly until all layers are formed to define a completed component 22.

Figure 2:
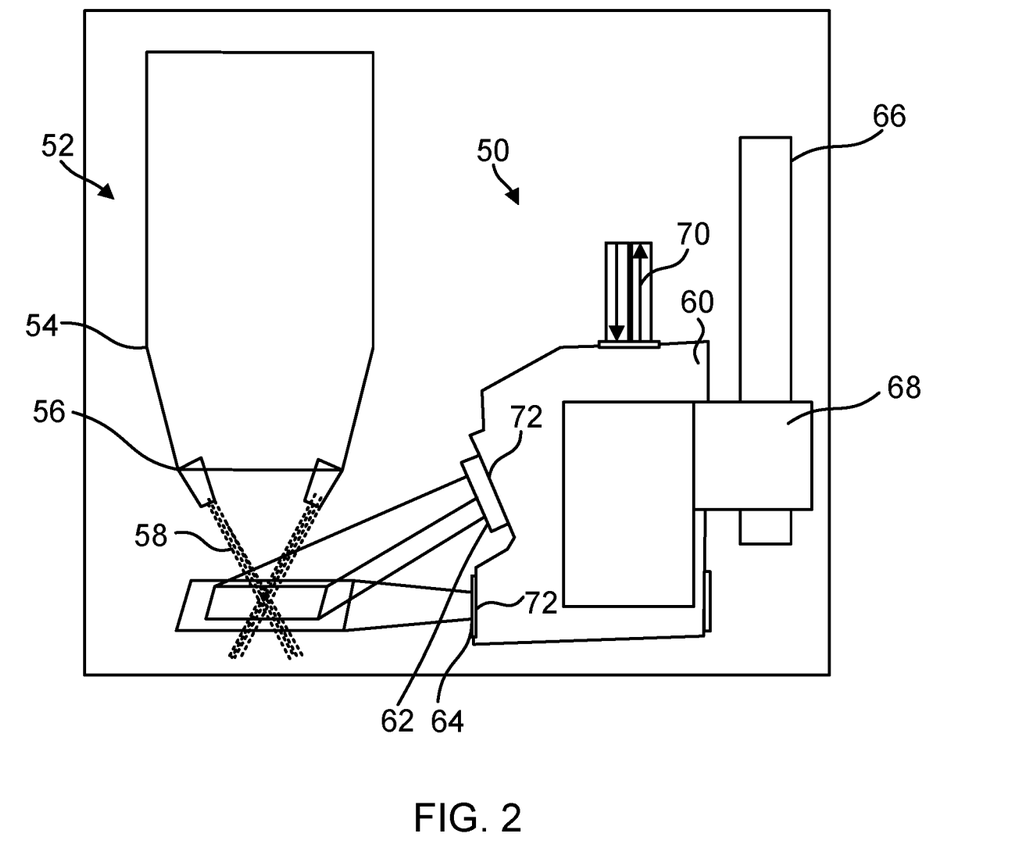
FIG. 2 is a conceptual and schematic diagram illustrating an example powder flow monitoring system configured to monitor powder flow between a powder delivery device and a build surface during the additive manufacturing technique.

FIG. 2 is a conceptual and schematic diagram illustrating an example powder flow monitoring system 50 configured to monitor powder flow between a powder delivery device 52 and a build surface (not shown in FIG. 2) during an additive manufacturing technique. Powder delivery device 52 may be an example of powder delivery device 14 of FIG. 1, and PFMS may be an example of PFMS 18 of FIG. 1.

Powder delivery device 52 includes a deposition head 54 that carries a plurality of powder nozzles 56. Plurality of powder nozzles 56 output a powder stream 58 toward the build surface. As shown in FIG. 2, the powder stream 58 may be focused at a focal plane, such that powder stream 58 is converging toward the focal plane and diverging away from the focal plane.

PFMS 18 includes a housing 60 (also referred to as an enclosure), which encloses an imaging device 62 and an illumination device 64. In some examples, imaging device 62 may be a high-speed camera and illumination device 64 may be laser illuminator. Housing 60 is attached to an adjustable z-stage 66 by a bracket 68.

Housing 60 is configured to enclose imaging device 62 and illumination device 64 and help protect imaging device 62 and illumination device 64 from a surrounding environment. For instance, housing 60 may be configured to surround imaging device 62 and illumination device 64 and prevent any powder that reflects from the build surface toward PFMS 18 from impacting imaging device 62 or illumination device 64.

Further, housing 60 may be configured to cool imaging device 62 and illumination device 64. Imaging device 62 and illumination device 64 may be exposed to heat from the melt pool at the build surface and energy from the energy delivery device. Imaging device 62 and illumination device 64 may be relatively sensitive to heat and have improved operational lifetime if maintained and operated below a certain temperature. PFMS 50 may include a cooling system 70 configured to remove heat from within housing 60 to cooling imaging device 62 and illumination device 64. For instance, cooling system 70 may include cooling fluid circuit through which a cooling fluid flows, and housing 60 may include part of the cooling circuit. In some examples, housing 60 may be formed from a material having relatively high thermal conductivity, such as aluminum, to help transfer heat from within housing 60 to cooling system 70 (e.g., a cooling fluid flowing through cooling system 70).

Figure 3:
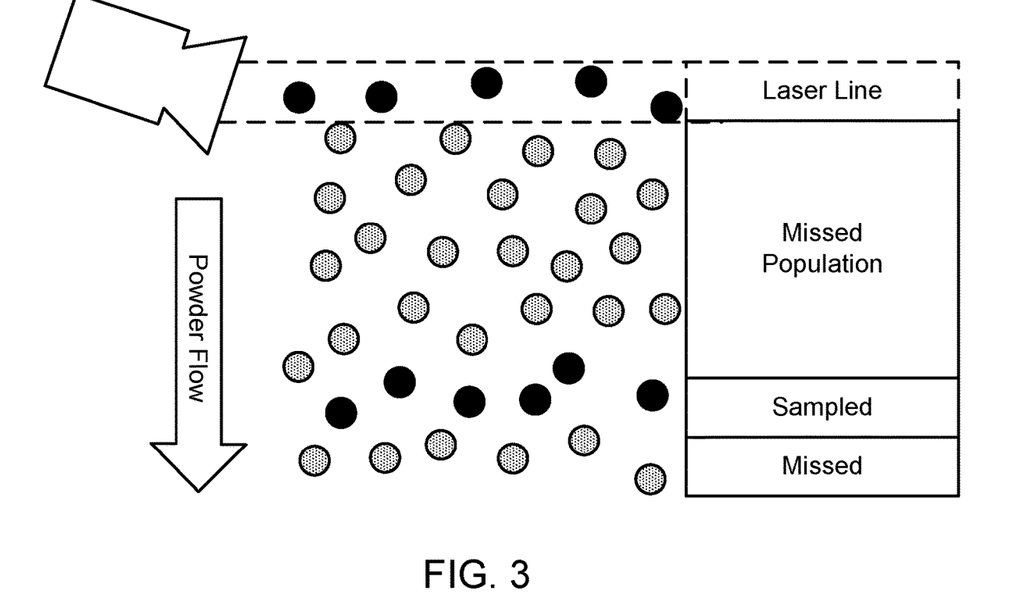
FIG. 3 is a conceptual diagram illustrating an example of portions of a powder stream imaged by a powder flow monitoring system.

As described above, PFMS 50 may be configured to measure powder flow of powder stream 58 (FIG. 2) at one or more axial (or longitudinal) locations of powder stream 58 and determine one or more parameters associated with the powder flow. For instance, illumination device 64 may illuminate powder of powder stream 58 in a plane oriented substantially orthogonal to a longitudinal axis that extends from powder delivery device 52 to the build surface. PFMS 50 may be positioned at a selected axial or longitudinal location to image a selected axial or longitudinal position between powder delivery device 52 and the build surface. Imaging device 62 may be configured to image at least some of the illuminated powder. FIG. 3 is a conceptual diagram illustrating an example of portions of a powder stream imaged by a powder flow monitoring system.

As shown in FIG. 3, since powder is flowing in powder stream 58 at a relatively high velocity, imaging device 62 may not capture images of all the powder in powder stream 58. The fraction of powder that imaging device 62 captures images of may be a function of average powder velocity at the image plane and a frame rate or capture speed of imaging device 62. This is represented in FIG. 3 as "sampled" particles and "missed population" particles. The fraction of particles imaged by imaging device 62 may, in some examples, be less than about 50%, less than about 40%, less than about 30%, less than about 25%, less than about 20%, or less than about 15%.

PFMS 50 may include a computing device (e.g., computing device 12 of FIG. 1) configured to analyze images captured by imaging device 62 to identify a number of particle detections in each captured image and, optionally, derive further parameters from the number of particle detections. As such, computing device 12 may be configured to receive image data representing an image captured by imaging device 62. The image data may include representations of illuminated powder of powder stream 58, as imaged by imaging device 62 (e.g., as captured in an image frame by imaging device 62). Computing device 12 may be configured to generate a representation of powder stream based on the image data and output the representation of the powder stream for display at a display device.

For instance, computing device 12 may be configured determine a powder mass flow represented by the image data. To do so, computing device 12 may be configured to identify a number of powder particles within each image frame. In some examples, computing device 12 additionally may be configured to identify a size and/or shape of each powder particle within each image frame. Computing device 12 may be configured to implement any suitable image analysis technique to identify powder particles, and, optionally, size and/or shape of powder particles.

Figure 4:
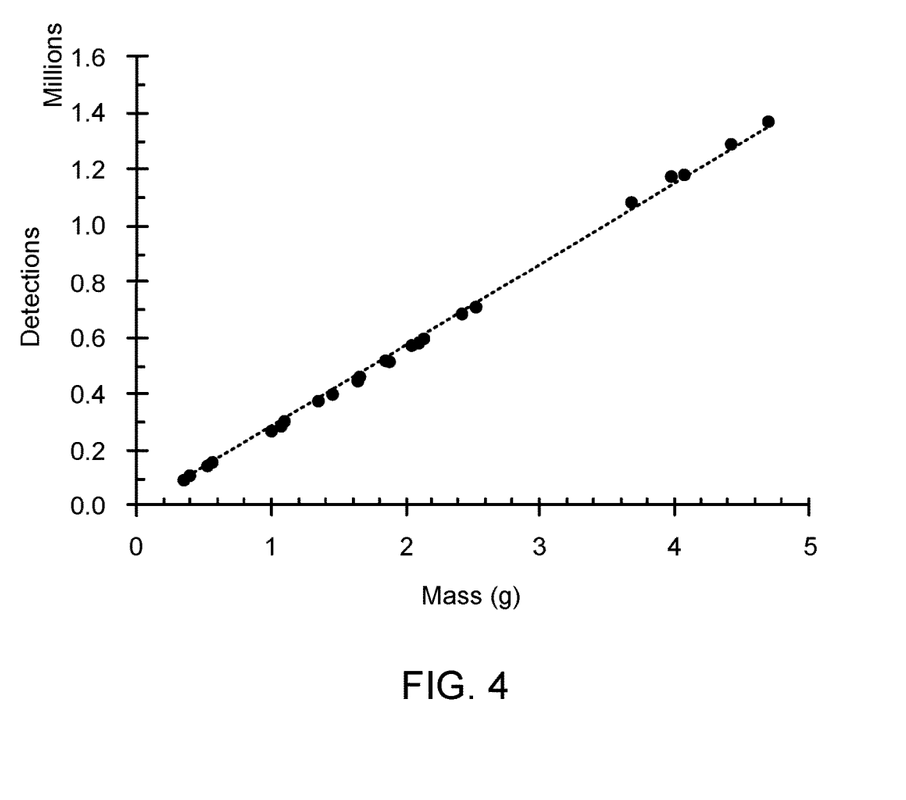
FIG. 4 is an example calibration curve of particle detections versus mass flow.

Once computing device 12 has identified a number of powder particles within an image frame, computing device 12 may be configured to determine a mass flow based on the number of powder particles. For example, computing device 12 may be configured to determine the mass flow based on a calibration equation or calibration curve. FIG. 5 is an example calibration curve of particle detections versus mass flow. As shown in FIG. 4, the relationship between particle detections may be substantially linear.

The relationship between particle detections and mass flow may be determined experimentally. For instance, the relationship between particle detections and mass flow may be determined for each powder type (e.g., composition, size distribution, or both), as each powder type may have a different relationship between particle detections and mass flow. The relationship may be determined experimentally by flowing a known mass of powder at a known rate, and imaging the powder. By doing this multiple times at multiple rates, the calibration curve may be generated. The curve, in the form of an equation, a look-up table, or the like, may be stored in computing device 12, and computing device 12 may use the calibration curve to determine mass flow of a similar type of powder at a different flow rate based on particle detections.

In some examples, computing device 12 may receive image data representative of a sequence of images of illuminated powder in powder stream 58. Each image may be associated with a time. As such, computing device 12 may select one or more images of the sequence of images and analyze the one or more images. For each selected image, computing device 12 may be configured to identify a number of particle detections and, optionally, determine a mass flow associated with powder stream 58 for each image frame.

As described above, system 10 may include both mass flow monitoring and heat flow monitoring, but FIG. 1 illustrates only mass flow monitoring aspects of system 10. FIG. 5 is a conceptual block diagram illustrating heat flow monitoring aspects of the example additive manufacturing system 10 of FIG. 1, including an optical system 80 for observing thermal emissions around melt pool 32 and a thermal camera 82 for monitoring a size and/or temperature of melt pool 32. Identical reference numerals in FIGS. 1 and 5 refer to the same parts. Further, those common parts are the same or substantially identical, aside from any differences described herein.

As shown in FIG. 5, system 10 includes an optical system 80. During additive manufacturing, component 22 is built up by adding material to component 22 in sequential layers. The final component is composed of a plurality of layers of material. Energy delivery device 16 may direct energy 34 at first layer 24 to form melt pool 32. Powder delivery device 14 may deliver powder stream 30 to melt pool 32, where at least some of the powder at least partially melts and is joined to first layer 24. Melt pool 32 cools as energy 34 is no longer delivered to that location of first layer 24 (e.g., due to energy delivery device 16 scanning energy 34 over the surface of first layer 24). The temperature and cooling rate of melt pool 32 and the surrounding areas of first layer 24 affect the microstructure of the component 22 formed using the additive manufacturing technique.

In many cases, energy 34 output by energy delivery device 16 is very high temperature and the intensity of its thermal emissions is significantly greater than the intensity of thermal emissions from melt pool 32 and the surrounding areas. Similarly, thermal emissions intensity at and near the center of melt pool 32 may be significantly greater than the intensity of thermal emissions near the edge of melt pool 32 and in areas surrounding melt pool 32. Because of this, it may be difficult to accurately measure temperature and cooling rate of areas near the edge of melt pool 32 and in areas surrounding melt pool 32. This results in difficulty predicting and controlling microstructure of the additively manufactured component 22.

Optical system 80 may include an imaging device and an associated optical train, which senses emissions at or near component 22 during the additive manufacturing technique. For example, optical system 80 may include a visible light imaging device, an infrared imaging device, or an imaging device that is configured (e.g., using a filter) to image a specific wavelength or wavelength range.

The optical train may include one or more reflective, refractive, diffractive optical components configured to direct light to the imaging device. For example, the optical train may be configured to direct light from near component 22 and/or melt pool 32 to the imaging device. In some examples, at least a portion of the optical train is coaxial with the axis at which energy delivery device 16 outputs energy, and the at least a portion of the optical train may be attached to or otherwise configured to move with the portion of energy delivery device 16 that directs or focuses energy 34 at or near the surface of component 22. In this way, optical system 80 may move with energy delivery device 16 and track melt pool 32 as melt pool 32 moves across component 22, without needing to correct for any offsets between energy delivery device 16 and optical system 80 and/or needing to correct for geometry of component 22. In other examples, the optical train may not be coaxial with the axis at which energy delivery device 16 outputs energy 34, and computing device 12 may be configured to compensate for the offset and any affects this may have on the imaging, including shadowing, interference, geometry of component 22, or the like.

Optical system 80 may include an occulting device. The occulting device is configured to reduce or block emissions (e.g., thermal emissions) that originate from the energy output by energy delivery device 16 and/or near a center of melt pool 32, which otherwise obfuscate emissions from solidifying regions of material at or near the edge of melt pool 32 and outside of melt pool 32. The occulting device may be a rigid occulting device or a dynamic occulting device. A rigid occulting device reduces or blocks emissions from a fixed region, e.g., from the energy 34 output by energy delivery device 16. For instance, a rigid occulting device may include a device with fixed dimensions that is opaque to wavelengths of interest. As another example, a rigid occulting device may include an apodizing lens in which a center of the lens if substantially opaque to wavelengths of interest and opacity decreases as a function of radius.

A dynamic occulting device is configured to be controlled to occult different regions, e.g., different sizes and/or shapes. A dynamic occulting device may include a rigid occulting device that is mounted to a device that can translate the rigid occulting device along and/or perpendicularly to the optical axis. As another example, a dynamic occulting device may include an opaque and viscous liquid, such as mercury, contained between two substrates. The substrates are substantially transparent to the wavelength(s) of interest. One or both of the substrates may be movable relative to the other substrate to control the distance between the substrates. By reducing the distance between the substrates, the size of the occulting region may increase. By increasing the distance between the substrates, the size of the occulting region may decrease. As a third example, a dynamic occulting device may include a digital micromirror device. Computing device 12 may be configured to control the micromirrors of the digital micromirror device to direct emissions that originate from energy 34 output by energy delivery device 16 and/or near a center of the melt pool away from the imaging device. A digital micromirror device may enable control of both the size and shape of the region of emissions that are occulted.

Figure 6:
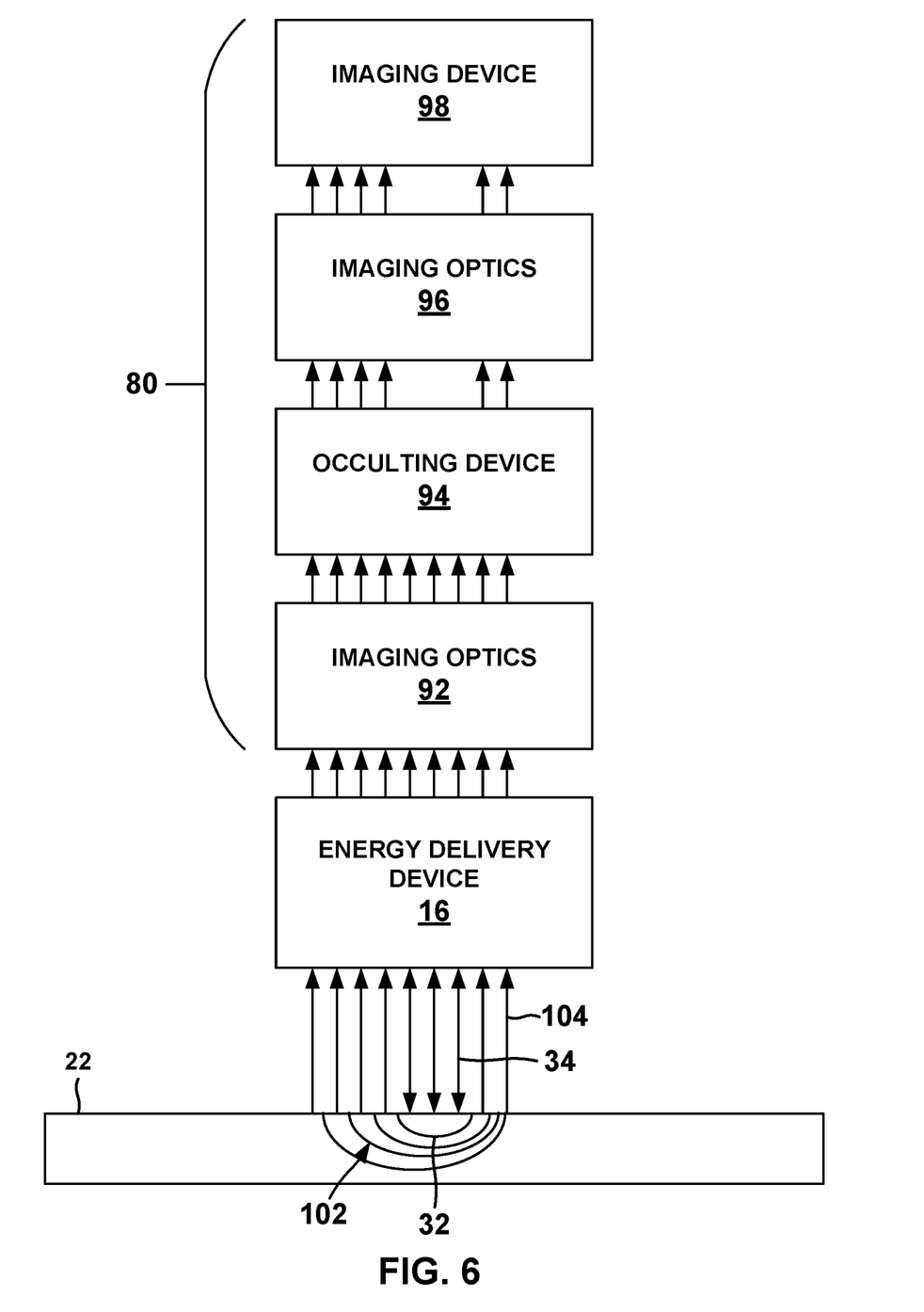
FIG. 6 is a conceptual block diagram illustrating an example optical system for observing thermal emissions around a melt pool formed during the additive manufacturing technique.

FIG. 6 is a conceptual block diagram illustrating an example optical system 80 for observing thermal emissions at and/or around a melt pool 32 formed during an additive manufacturing technique. Optical system 80 includes an optical train that includes first imaging optics 92, occulting device 94, second imaging optics 96, and imaging device 98. Imaging device 98 may be any suitable imaging device, including, for example, a visible light imaging device, an infrared imaging device, an imaging device that is configured (e.g., using a filter) to image a specific wavelength or wavelength range, a two color pyrometry imaging device, or the like.

First and second imaging optics 92 and 96 may each include one or more optical devices used to direct light to imaging device 98. For example, First and second imaging optics 92 and 96 may each include one or more refractive optical device (e.g., a lens), one or more reflective optical device (e.g., a mirror), one or more diffractive optical devices (e.g., a grating), one or more dichroic optical devices (e.g., a dichroic filter or mirror), or the like. Although two sets of imaging optics 92 and 98 are shown in FIG. 2, in other examples, system 80 may include a single set of imaging optics or more than two sets of imaging optics.

Occulting device 94 is positioned within the optical train between first imaging optics 92 and second imaging optics 96. In other example, occulting device 94 may be positioned between imaging device 98 and imaging optics 96 or after before imaging optics 92. In some examples, occulting device 94 is positioned as the optical component nearest imaging device. This effectively results in removal of the portion of the image which occulting device 94 blocks. In other examples, occulting device 94 is positioned at another position within the optical train 80 where the image of component 22 resolves. Imaging optics 96 then may be configured to image occulting device 94 onto imaging device 98.

As shown in FIG. 6, in some examples, at least a portion of optical system 80 is coaxial with the axis at which energy delivery device 16 outputs energy 34. For example, at least a portion of second imaging optics 92 (e.g., the portion at which emitted light 104 is incident upon second imaging optics 92) may be coaxial with the axis at which energy delivery device 16 outputs energy 34. This may reduce image manipulation that otherwise may be applied to the resulting image to correct for geometry of component 22, angular offset of optical system 80 relative to energy delivery device 16, shadowing due to the angular offset, interference, or the like. In other examples, optical system 80 (e.g., the portion at which emitted light 104 is incident upon second imaging optics 92) may not be coaxial with the axis at which energy delivery device 16 outputs energy 34, and computing device 12 (FIG. 1) or another computing device may be configured to manipulate the resulting image to compensate for geometry of component 22, angular offset of optical system 80 relative to energy delivery device 16, shadowing due to the angular offset, interference, or the like.

FIG. 6 also illustrates energy delivery device 16 outputting energy 34, which is incident upon component 22 and results in formation of melt pool 32. Surrounding melt pool is a cooling zone 102, in which temperature gradients from the temperature of melt pool 32 to ambient temperature are present. As shown in FIG. 6, melt pool 32 and cooling zone 102 emit thermal emissions 104 (e.g., thermal radiation), which travel through optical system 80 to imaging device 98, which images the thermal emissions 104. Occulting device 94 occults (e.g., reduces the intensity of or substantially eliminates) thermal emissions 104 from a selected region, e.g., a region corresponding to energy 34 and at least a portion of melt pool 32. This may allow imaging device 98 to more effectively image relatively lower intensity thermal emissions from at or near the edge of melt pool 32 and within cooling zone 102. This may enable more accurate measurement of temperatures within the cooling zone 102, and heat flow within cooling zone 102.

Returning to FIG. 5, system 10 also includes melt pool monitor ("MP monitor") 82. Melt pool monitor 82 may include a sensor for monitoring a characteristic of melt pool 32. The sensor may include an imaging system, such as a visual or thermal camera, e.g., camera to visible light or infrared (IR) radiation. A visible light camera may monitor the geometry of the melt pool, e.g., a width, diameter, shape, or the like. A thermal (or IR) camera may be used to detect the size, temperature, or both of the melt pool. In some examples, a thermal camera may be used to detect the temperature of the melt pool at multiple positions within the melt pool, such as a leading edge, a center, and a trailing edge of the melt pool. In some examples, the imaging system may include a relatively high speed camera capable of capturing image data at a rate of tens or hundreds of frames per second or more, which may facilitate real-time detection of the characteristic of the melt pool.

Figure 7:
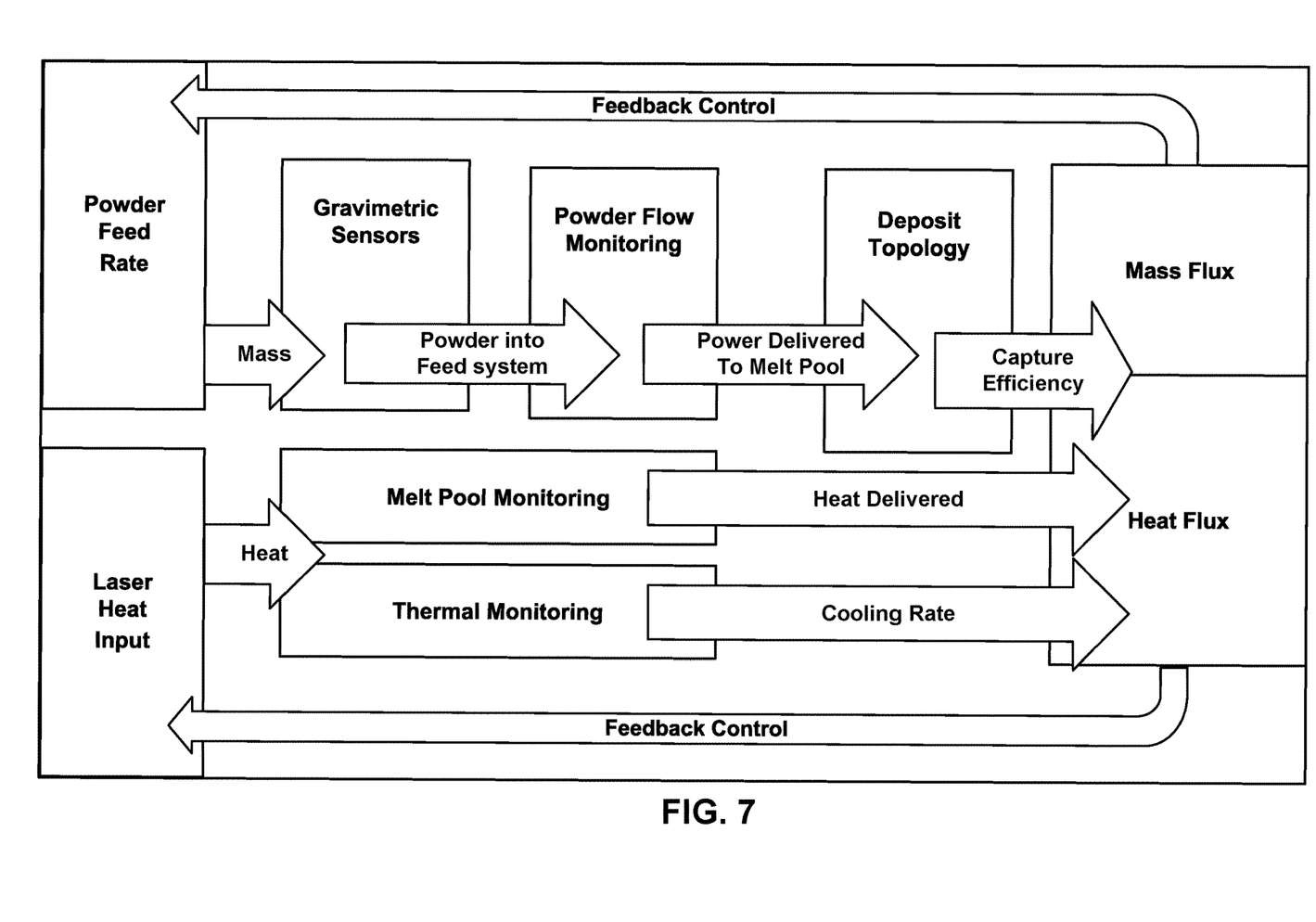
FIG. 7 is a process flow diagram illustrating a mass flux and heat flux monitoring and control technique.

FIG. 7 is a process flow diagram illustrating a mass flux and heat flux monitoring and control technique. The technique of FIG. 7 may be implemented by system 10 of FIGS. 1 and 5 and will be described with concurrent reference to FIGS. 1 and 5. However, it will be appreciated that system 10 may perform other techniques and the technique of FIG. 7 may be performed by other systems.

One or more computing devices 12 may be configured to control a powder feed rate output by powder source 42 (see top left of FIG. 7). For instance, one or more computing devices 12 may be configured to control an agitator of powder source 42, a gas flow rate of gas flowing through powder source 42, a position of one or more valves within flow path 46, or the like to control a powder feed rate output by powder source 42.

One or more computing devices 12 may be configured to receive data from one or more mass flow monitoring sensors, including PFMS 18, powder flow mass sensor 44, and/or topology sensor 48. Data received from powder flow mass sensor 44 indicates a mass flow of powder from powder source 42 to powder delivery device. Data from PFMS 18 indicates a mass flow of powder in powder stream 30 between powder delivery device 14 to adjacent melt pool 32. Data from topology sensor 48 indicates powder mass captured by melt pool 32 and added to component 22.

One or more computing devices 12 may calculate one or more mass flow-related metrics based on the data received from PFMS 18, powder flow mass sensor 44, and/or topology sensor 48. For example, one or more computing devices 12 may determine a capture efficiency by determining a fraction or percentage of powder from powder stream 30 that is captured by melt pool 32 and added to component 22, e.g., by dividing the powder mass captured by melt pool 32, as determined based on data from topology sensor, into the mass flow determined based on data received from PFMS 18.

Further, one or more computing devices 12 may determine an overall mass flux using the data received from PFMS 18, powder flow mass sensor 44, and/or topology sensor 48. One or more computing devices 12 then may use the overall mass flux as an input to the control algorithm used to control the powder feed rate output by powder source 42 (see top left of FIG. 7).

Similarly, one or more computing devices 12 may be configured to control energy delivery device 16 to deliver energy 34 to first layer 24 to establish a given heat input (see bottom left of FIG. 7). For example, one or more computing device 12 may control one or more operating parameters of energy delivery device 16, such as intensity, pulse rate, pulse width, or the like; one or more positional parameters related to energy delivery device 16, such as dwell time at a location, a movement rate relative to first layer 24, an overlap between adjacent passes of energy 34 across first layer 24, a pause time between adjacent passes of energy 34 across first layer 24, or the like to control heat input to system 10 (e.g., to melt pool 32 and component 22).

One or more computing devices 12 may be configured to receive from one or more heat sensors, such as optical system 80 and/or melt pool monitor 82. One or more computing devices may determine a cooling rate and associated heat from using data from optical system 80 and may determine a heat input into component using a size and/or temperature of melt pool 32 as observed by melt pool monitor. One or more computing devices 12 may be configured to determine an overall heat flux using these data. One or more computing devices 12 then may use the overall heat flux as an input to the control algorithm used to control the energy delivery by energy delivery device 16 (see top left of FIG. 7).

In some examples, one or more computing devices 12 also may use the deposit topology (captured powder mass) and/or capture efficiency metric in the determination of the heat flux, as the added powder mass and quench effects associated with the captured powder affect the cooling rate.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. An additive manufacturing system comprising:
    an energy delivery device configured to deliver energy to a build surface of a component to form a melt pool in the build surface of the component;
    a powder delivery device configured to direct a powder stream toward the melt pool along a longitudinal axis;
    a plurality of mass sensors, each mass sensor associated with a portion of the additive manufacturing system, wherein the plurality of mass sensors comprises a topology sensor configured to measure a topology of material added to the melt pool;
    a plurality of heat sensors; and
    one or more computing devices configured to:
        receive data from the plurality of mass sensors, wherein the data includes the topology of the material added to the melt pool;
        determine an overall mass flux based on the data from the plurality of mass sensors;
        control the powder delivery device based on the overall mass flux;
        receive data from the plurality of heat sensors;
        determine a mass of powder added to the melt pool based on the topology of the material added to the melt pool and a density of the powder;
        determine a capture efficiency by dividing at least one of:
            the mass of powder added to the melt pool by a mass of powder leaving the powder delivery device; or
            a mass rate of powder added to the melt pool by a mass flow rate of powder leaving the powder delivery device;
        determine an overall heat flux based on the data from the plurality of heat sensors and the capture efficiency; and
        control the energy delivery device based on the overall heat flux.

2. The additive manufacturing system of claim 1, wherein the plurality of mass sensors comprise a powder flow monitoring system comprising:
    an illumination device configured to illuminate at least some powder of the powder stream between the powder delivery device and the build surface; and
    an imaging device configured to image the illuminated powder at an image plane that intersects the longitudinal axis, and wherein the one or more computing devices is configured to determine a mass flow rate of powder from the powder delivery device using data from the powder flow monitoring system.

3. The additive manufacturing system of claim 1, wherein the plurality of mass sensors comprise a powder source mass sensor configured to measure a mass of powder leaving a powder source for delivery to the powder delivery device.

4. The additive manufacturing system of claim 1, wherein the plurality of heat sensors comprises an optical system configured to image an area surrounding the melt pool, wherein the optical system comprises an occulting device configured to at least partially occult the melt pool and energy from the energy delivery device.

5. The additive manufacturing system of claim 4, wherein the computing device is configured to determine a cooling rate of material surrounding the melt pool based on data received from the optical system.

6. The additive manufacturing system of claim 1, wherein the plurality of heat sensors comprises an imaging device configured to image the melt pool, wherein the computing device is configured to determine at least one of a size of the melt pool or a temperature of the melt pool based on data received from the imaging device.

7. A method comprising:
    receiving, by one or more computing devices, data from a plurality of mass sensors of an additive manufacturing system, wherein the additive manufacturing system comprises an energy delivery device configured to deliver energy to a build surface of a component to form a melt pool in the build surface of a component, a powder delivery device configured to direct a powder stream toward the melt pool along a longitudinal axis, the plurality of mass sensors, each mass sensor associated with a portion of the additive manufacturing system, and a plurality of heat sensors, wherein the plurality of mass sensors comprises a topology sensor configured to measure a topology of material added to the melt pool, and wherein the data from the plurality of mass sensors includes the topology of the material added to the melt pool;
    determining, by the one or more computing devices, an overall mass flux based on the data from the plurality of mass sensors;
    controlling, by the one or more computing devices, the powder delivery device based on the overall mass flux;
    receiving, by the one or more computing devices, data from the plurality of heat sensors;
    determining, by the one or more computing devices, a mass of powder added to the melt pool based on the topology of the material added to the melt pool and a density of the powder;
    determining, by the one or more computing devices, a capture efficiency by dividing at least one of:
        the mass of powder added to the melt pool by a mass of powder leaving the powder delivery device; or
        a mass rate of powder added to the melt pool by a mass flow rate of powder leaving the powder delivery device;
    determining, by the one or more computing devices, an overall heat flux based on the data from the plurality of heat sensors and the capture efficiency; and
    controlling, by the one or more computing devices, the energy delivery device based on the overall heat flux.

8. The method of claim 7, wherein the plurality of mass sensors comprise a powder flow monitoring system comprising an illumination device configured to illuminate at least some powder of the powder stream between the powder delivery device and the build surface, and an imaging device configured to image the illuminated powder at an image plane that intersects the longitudinal axis, the method further comprising:
    determining, by the one or more computing device, a mass flow rate of powder from the powder delivery device using data from the powder flow monitoring system.

9. The method of claim 7, wherein the plurality of mass sensors comprise a powder source mass sensor configured to measure a mass of powder leaving a powder source for delivery to the powder delivery device.

10. The method of claim 7,
wherein the plurality of heat sensors comprises an optical system configured to image an area surrounding the melt pool,
wherein the optical system comprises an occulting device configured to at least partially occult the melt pool and energy from the energy delivery device.

11. The method of claim 10, further comprising:
determining, by the one or more computing devices, a cooling rate of material surrounding the melt pool based on data received from the optical system, wherein determining the overall mass flux is based on the cooling rate.

12. The method of claim 7, wherein the plurality of heat sensors comprises an imaging device configured to image the melt pool, the method further comprising:
determining at least one of a size of the melt pool or a temperature of the melt pool based on data received from the imaging device, determining the overall mass flux is based on the size of the melt pool.

* * * * *